(12) United States Patent
Tuempner

(10) Patent No.: US 10,356,347 B2
(45) Date of Patent: Jul. 16, 2019

(54) DIGITAL IMAGING SYSTEM AND METHOD FOR CORRECTING ERRORS IN SUCH A SYSTEM

(71) Applicant: OLYMPUS SOFT IMAGING SOLUTIONS GMBH, Muenster (DE)

(72) Inventor: Juergen Tuempner, Muenster (DE)

(73) Assignee: OLYMPUS SOFT IMAGING SOLUTIONS GMBH, Muenster (DE)

( * ) Notice: Subject to any disclaimer, the term of this patent is extended or adjusted under 35 U.S.C. 154(b) by 64 days.

(21) Appl. No.: 15/612,000

(22) Filed: Jun. 2, 2017

(65) Prior Publication Data

US 2017/0272669 A1 Sep. 21, 2017

Related U.S. Application Data

(63) Continuation of application No. PCT/EP2015/077612, filed on Nov. 25, 2015.

(30) Foreign Application Priority Data

Dec. 2, 2014 (DE) .......................... 10 2014 224 638

(51) Int. Cl.
*H04N 9/64* (2006.01)
*H04N 5/361* (2011.01)
(Continued)

(52) U.S. Cl.
CPC ............ *H04N 5/361* (2013.01); *G06T 5/002* (2013.01); *G06T 5/10* (2013.01); *H04N 5/378* (2013.01)

(58) Field of Classification Search
CPC .................. H04N 5/361; H04N 5/378; H04N 5/357–365; H04N 5/2175; H04N 5/2176; H04N 5/2178; G06T 5/002; G06T 5/10
See application file for complete search history.

(56) References Cited

U.S. PATENT DOCUMENTS 3,952,186 A 4/1976 Speiser et al.
6,061,092 A * 5/2000 Bakhle ................... H04N 5/232
348/243

(Continued)

FOREIGN PATENT DOCUMENTS

JP H11-2988762 A 10/1999

OTHER PUBLICATIONS

International Search Report dated Feb. 19, 2016 issued in PCT/EP2015/077612.

(Continued)

*Primary Examiner* — Sinh Tran
*Assistant Examiner* — Selam T Gebriel
(74) *Attorney, Agent, or Firm* — Scully, Scott, Murphy & Presser, P.C.

(57) ABSTRACT

A digital imaging system and method for correcting errors in the digital imaging system, the digital imaging system having an image sensor, a readout apparatus for reading out the image sensor, wherein a dark current image is captured using the image sensor and the readout apparatus, and a processor comprising hardware wherein the processor is configured to perform the method comprising: generating a Fourier transform by means of a Fourier transformation on the basis of the image data of the dark current image; storing data which describe the Fourier transform; back-transforming the Fourier transform by subjecting the saved data to Fourier transformation and generating a corrective image from the back-transformed data, and correcting image errors in the digital imaging system in another image captured using the digital imaging system by offsetting image data from the captured image with image data from the corrective image.

8 Claims, 11 Drawing Sheets

(51) Int. Cl.
    *G06T 5/00*     (2006.01)
    *G06T 5/10*     (2006.01)
    *H04N 5/378*     (2011.01)

(56) References Cited

U.S. PATENT DOCUMENTS

| | | | |
|---|---|---|---|
| 6,473,124 | B1 | 10/2002 | Panicacci et al. |
| 7,505,619 | B2 * | 3/2009 | Mapoles ............... G01N 21/47 250/559.07 |
| 2007/0230776 | A1 * | 10/2007 | Edgar ................... G06T 7/0004 382/162 |
| 2008/0062262 | A1 * | 3/2008 | Perron ................. G01V 5/0008 348/82 |
| 2009/0244331 | A1 | 10/2009 | Suzuki et al. |
| 2012/0033112 | A1 | 2/2012 | Wirth et al. |
| 2014/0241632 | A1 * | 8/2014 | Nagai ..................... A61B 6/00 382/190 |

OTHER PUBLICATIONS

Vago, Jorge L. et al., "Fast Fourier transform based image compression algorithm optimized for speckle interferometer measurements", Optical Engineering, Society of Photo-Optical Instrumentation Engineers, Bellingham, vol. 36, No. 11, Nov. 1, 1997, pp. 3052-3063.

German Office Action from German Patent Application No. 102014224638 dated Feb. 9, 2018, together with an English translation of Part B, 1st-3rd paragraphs on p. 2, 7 pages total.

Dengler, M.: "Filterung im Frequenzraum: Fouriertransformation. Proseminar: Grundlagen Bildverarbeitung / Bildverstehen der Fakultät für Informatik, Forschungs- und Lehreinheit Informatik IX, Technische Universität München", dated Jan. 23, 2007, together with an English translation of paragraph 3 on page 14.

* cited by examiner

DIGITAL IMAGING SYSTEM AND METHOD FOR CORRECTING ERRORS IN SUCH A SYSTEM

CROSS REFERENCES TO RELATED APPLICATIONS

This application is a continuation of PCT International Application No. PCT/EP2015/077612, filed on Nov. 25, 2015, incorporated herein by reference, and which claims the benefit of priority from German Patent Application No. DE 1020140224638.5, filed on Dec. 2, 2014, incorporated herein by reference.

BACKGROUND

The invention relates to a method for correcting errors in a digital imaging system having an image sensor and a readout apparatus for reading out the image sensor, in which a dark current image is captured using the image sensor and the readout apparatus. Moreover, the invention relates to a digital imaging system with an image sensor and with a readout apparatus for reading out the image sensor, wherein the readout apparatus is configured to capture a dark current image with the image sensor.

Digital imaging systems are well known and are used for various applications. For example, a digital camera or a digital video camera comprises such a system.

The image sensors used in the digital imaging systems, such as a charged-coupled device (CCD) or complementary metal-oxide semiconductor (CMOS) sensors, frequently have inhomogenous dark current noise in the sensor plane. This relates to both linear image sensors such as those used in line scan cameras, as well as flat image sensors such as those used in cameras. The image captured by a completely dark image sensor frequently manifests a weak pattern of stripes. The inhomogenous capturing characteristic of the image sensors arises from production-related tolerances and systemic characteristics of the employed camera electronics.

For end-user applications, the artifacts that arise in the captured images, which are manifested in particular as a slightly varying image brightness, tend to play a subordinate role. For professional applications such as imaging in microscopy, such systematic image errors are however, undesirable. The differences of the background signal in the sensor plane reduce the signal-to-noise ratio and overlap the weak light intensities of the captured images.

In order to correct the systematic image errors, a corrective image is taken for the individual sensor in a calibration process. During the calibration process, the image sensor is completely darkened, e.g., covered. As a corrective image, a so-called dark current image is then taken that reproduces the dark current noise of the image sensor. Then, this corrective image specific to the sensor is removed from the images captured with this sensor. This form of calibration is possible since, when the sensor is completely darkened, the arising image errors do not depend on the amount of incident light or the quantum efficiency of the individual pixels of the image sensor. The sensor errors add up as they overlap the captured image.

The corrective image is normally stored in a memory of an image processing unit coupled to the camera, such as a hard disk of a computer. This corrective image is then removed from each image captured with the assistance of the imaging system, for example by the image processing unit executing a program.

The object of the invention is to present an improved method for correcting the errors in a digital imaging system and to present an improved digital imaging system, wherein the design complexity of the digital imaging system is minimal.

SUMMARY

The object of the invention can be solved by a method for correcting errors in a digital imaging system having an image sensor and a readout apparatus for reading out the image sensor, wherein a dark current image is captured using the image sensor and the readout apparatus, wherein the method comprises: generating a Fourier transform by means of a Fourier transformation on the basis of the image data of the dark current image; saving data which describe the Fourier transform; back-transforming the Fourier transform by subjecting the saved data to Fourier transformation and generating a corrective image from the back-transformed data; and correcting image errors in the imaging system in another image captured using the imaging system by offsetting image data from the captured image with image data from the corrective image.

The Fourier transform is calculated based on the image data from the dark current image. The image sensor of the digital imaging system can be a flat image sensor such as a CCD or CMOS sensor that supplies a dark current image with a pixel-wise resolution. The image sensor can be a linear sensor used in a line scan camera. The Fourier transform can be a discrete Fourier transform (DFT). The fast Fourier transform (FFT) is suitable for calculating the DFT. The algorithms for efficiently calculating an FFT are well-known. The data describing the Fourier transform can be the amplitude and phase image in the Fourier space, the Fourier coefficient, and the phases of the oscillations used to calculate the FFT.

In particular, non-dynamic image errors that are stationary relative to the image sensor can be corrected with the assistance of the method for correcting errors according to the invention.

The image errors can be corrected by offsetting image data from the captured image with image data from the corrective image by removing the image data of the corrective image from the image data of the captured other image. In particular, pixels from the corrective image are removed, or respectively subtracted from the captured image in order to correct the image errors.

Advantageously, the method can be used both to correct errors in a digital imaging system for capturing fixed images (photographs) as well as in a digital imaging system for capturing moving images (video images).

With the assistance of Fourier transformation, the image data from the dark current image is converted from the position space into the frequency space. This conversion, i.e., Fourier transformation, preferably occurs sequentially in several directions of the image. In particular, the Fourier transform of the dark current image is calculated by performing a discrete Fourier transform line by line, or respectively column by column, of the pixel values of the dark current image in a line or column. The brightness value is used as the pixel value, for example.

The image artifacts that occur in digital imaging systems frequently arise from the production process of the employed image sensors. Likewise, systemic characteristics such as the readout frequency used by the camera electronics are potential causes. A digital imaging system is calibrated with the assistance of a corrective image taken beforehand, generally a dark current image. This corrective image is traditionally archived on the non-volatile memory of a computer that is used to process the image data. When the image sensors are large and have a corresponding large number of pixels, a relatively large data memory is needed for this purpose, however.

On the other hand, the invention is based on the insight that the Fourier transformation of the dark current image from position space to frequency space makes it possible to easily manipulate the dark current image in a variety of ways. This preferably relates to the possibility of minimizing the needed memory for saving the dark current image.

According to an advantageous embodiment, the method for correcting errors is characterized in that the digital imaging system comprises a camera, wherein the camera comprises the image sensor and an in particular non-volatile data memory, and wherein the data describing the Fourier transform of the dark current image are saved in the data memory.

The non-volatile data memory can be a semiconductor memory module such as an erasable programmable read-only memory (EPROM) and flash memory. Moreover, ferroelectric random-acdess memory (FeRAM), magnetoresistive random-access memory (MRAM) and/or phase-change memory (PCRAM) memory modules are suitable. An example, the non-volatile data memory is an internal data memory in the camera.

Since the corrective image is stored, or respectively archived on this internal data memory of the camera, the corrective image is independent from the other imaging systems connected to the camera. If the hardware and/or software is altered of this other imaging system which, for example, is a computer, it is unnecessary to perform a recalibration of the imaging system. It is advantageously unnecessary to take another dark current image and save it on the altered or new system. The digital imaging system is safe and easy to handle. This especially holds true since it takes a certain amount of expertise to successfully and correctly perform the sensor calibration process.

According to another embodiment, the method for correcting errors is enhanced in that the Fourier transform is back-transformed, and in particular image errors are corrected, in the readout apparatus, wherein moreover the readout apparatus in particular comprises a camera of the imaging system.

The readout apparatus is for example a microcontroller that comprises the camera. The non-volatile data memory is preferably provided within the camera, such as an internal memory of the microcontroller. It is likewise possible for the data memory to be designed as a separate component and linked to the microcontroller.

Advantageously, the digital imaging system supplies (off-set) corrected image data to connected image processing units such as a computer used for evaluation. The user's effort for adapting between the digital imaging system and these additional image processing units is minor. The digital imaging system can therefore be flexibly used in various image processing units.

The method for correcting errors is moreover advantageously further developed in that the image sensor is a flat image sensor, wherein the Fourier transform of the dark current image is generated by generating a Fourier transformation along a line extending through the dark current image, which in particular runs through a center of the dark current image.

The Fourier transform of the dark current image advantageously comprises reduced image information that nonetheless contains the essential image information of the dark current image. This especially relates to artifacts which do not have a pronounced structure in another direction perpendicular to the line, such as stripe patterns.

According to another embodiment, a flat image sensor is provided that comprises a plurality of pixels arranged in a regular grid of lines and columns, wherein the data describing the dark current image are pixel values represented in this grid, and wherein a discrete Fourier transformation is carried out based on pixel values in a line or a column of the dark current image, and a Fourier transform is generated, wherein the line or column runs at least approximately through a center of the dark current image, and wherein the Fourier frequencies and associated Fourier parameters of the Fourier transform generated by lines or columns are saved as the data describing the Fourier transform of the dark current image.

According to another embodiment, a flat image sensor is provided that comprises a plurality of pixels arranged in a regular grid of lines and columns, wherein the data describing the dark current image are pixel values depicted in this grid, and wherein a discrete 2-D Fourier transform is generated based on these pixel values of the dark current image and is also depicted in the grid of the image sensor, and wherein Fourier frequencies and associated Fourier parameters are taken from the 2-D Fourier transform along a line or along a column, in particular along a line or a column that runs at least approximately through a center of the 2-D Fourier transform, and said Fourier frequencies and associated Fourier parameters are saved as data describing the Fourier transform.

Moreover, the method is further developed in that a flat image sensor is provided that comprises a plurality of pixels arranged in a regular grid of lines and columns, wherein the data describing the dark current image are pixel values depicted in this grid, and wherein the pixel values of the dark current image are totaled line by line and in particular averaged, and an average vertical brightness distribution is generated from the pixel values totaled line by line, and/or wherein the pixel values of the dark current image are totaled column by column and in particular averaged, and an average horizontal brightness distribution is generated from the pixel values totaled column by column, wherein a Fourier transform of the average horizontal and/or vertical brightness distribution is generated, and Fourier frequencies and associated Fourier parameters are taken from this/these Fourier transform(s) and saved as data describing the Fourier transform.

The aforementioned embodiments are based on the recognition that non-dynamic, stationary image errors have a preferred direction in many cases. Preferably, the image errors arise as horizontal or vertical stripe patterns with a preferential direction along the stripes. In many cases, they arise from the production process of the especially flat image sensor and are therefore oriented in the direction of the lines or columns of the image sensor.

Since the arising image errors are systematic, it is possible to reduce the Fourier transform of the dark current image so that only the errors that occur perpendicular to the preferential direction are considered in the Fourier transform. By means of this form of reducing the Fourier transform, the required memory for the description of the corrective image is significantly decreased. The cited embodiments are based on the insight that the reduction of the degree of complexity of the dark current image (offset image) is associated with a dramatic reduction of the number of required Fourier parameters, or respectively Fourier coefficients, to describe the dark current image.

The amount of data necessary to describe the corrective image in the Fourier space is many times less than the amount of data of the corrective image itself. This makes it possible to archive the corrective image on a comparatively small internal data memory of the camera. It is moreover possible to perform the correction of the image errors of the image sensor directly in the camera.

The required memory for the data describing the corrective image is further reduced when the method is developed so that data or data sets are selected from the data describing the Fourier transform whose values lie above an in particular predetermined threshold, and/or a predetermined number of data or data sets are selected from the data describing the Fourier transform whose values are the highest in comparison to the values of the remaining data or data sets, wherein a reduced data set describing the Fourier transform is formed from these selected data.

The description of the dark current image is restricted to those Fourier frequencies that contribute to an appreciable extent to the description of the corrective image. The amount of data needed to reconstruct the corrective image is significantly reduced once again. In comparison to a classic corrective image, a significantly reduced memory requirement results without an appreciable loss in quality being noticeable in the correction.

For example, an image sensor with a large number of pixels needs a memory between 10 and 100 MB for a conventional corrective image. By depicting the corrective image in Fourier space, the required memory is reduced by a factor of 1000 depending on the number of used Fourier frequencies. For example the memory requirement of 8.192 MB is reduce up to 8.192 kB with 2048 Fourier frequencies without an appreciable loss in quality. If horizontal influences are also to be corrected, the space requirement for the corrective image increases to 4096 Fourier frequencies. A reduction to the Fourier frequencies that appreciably contribute to the reconstruction of the corrective image leads to a further reduction of the amount of data needed to describe the corrective image.

The corrective image itself can be archived in a comparatively small internal data memory of a microcontroller so that a camera can easily save the corrective image.

The need to perform a calibration of the captured images in another imaging system connected to the digital imaging system is eliminated. The expertise needed by the user to handle the digital imaging system is very slight. Accordingly, the method for correcting errors in a digital imaging system, as well as the corresponding imaging system, are reliable and robust to use.

The object according to the invention can also be solved by a digital imaging system with an image sensor and a readout apparatus for reading out the image sensor, wherein the image sensor is configured to capture a dark current image, and a processor configured to: generate a Fourier transform by means of a Fourier transformation on the basis of the image data of the dark current image; save data describing the Fourier transform; back-transform the Fourier transform by subjecting the saved data to Fourier transformation and generating a corrective image from the back-transformed data; and correct image errors in the imaging system in another image captured using the imaging system by offsetting image data from the captured image with image data from the corrective image.

The image sensor can be a flat image sensor. According to other embodiments, the digital imaging system comprises a linear image sensor as is used for example in a line scan camera.

According to an advantageous embodiment, the digital imaging system comprises a camera, wherein the camera comprises the image sensor and an in particular non-volatile data memory, and the data memory is configured to save the data describing the Fourier transform of the dark current image in the data memory.

Moreover in particular, the readout apparatus is configured to back-transform the Fourier transform and in particular correct image errors, wherein moreover the readout apparatus in particular comprises a camera of the imaging system.

Moreover according to an embodiment, the image sensor can be a flat image sensor, and the processor is configured to generate the Fourier transform of the dark current image by generating a Fourier transformation along a line extending through the dark current image, which in particular runs through a center of the dark current image.

The digital imaging system can be further developed in that the image sensor can be a flat image sensor that comprises a plurality of pixels arranged in a regular grid of lines and columns, wherein the data describing the dark current image are pixel values depicted in this grid, and wherein the processor is configured to perform a discrete Fourier transformation based on pixel values in a line or a column of the dark current image, and to generate a Fourier transform, wherein the line or column runs at least approximately through a center of the dark current image, and Fourier frequencies and associated Fourier parameters of the Fourier transform generated by lines or columns are saved as data describing the Fourier transform of the dark current image.

According to another embodiment, the image sensor can be a flat image sensor that comprises a plurality of pixels arranged in a regular grid of lines and columns, wherein the data describing the dark current image are pixel values depicted in this grid, and wherein the processor is configured to generate a discrete 2-D Fourier transform that is based on these pixel values of the dark current image and is also depicted in the grid of the image sensor, and to take Fourier frequencies and associated Fourier parameters from the 2-D Fourier transform along a line or along a column, in particular along a line or a column that runs at least approximately through a center of the 2-D Fourier transform, and to save said Fourier frequencies and associated Fourier parameters as data describing the Fourier transform.

The digital imaging system can be advantageously further developed in that the image sensor can be a flat image sensor that comprises a plurality of pixels arranged in a regular grid of lines and columns, wherein the data describing the dark current image are pixel values depicted in this grid, and wherein the processor is configured to total and in particular average the pixel values of the dark current image line by line, and to generate an average vertical brightness distribution from the pixel values totaled line by line, and/or to total column by column and in particular average the pixel values of the dark current image, and to generate an average horizontal brightness distribution from the pixel values totaled column by column, and moreover to generate a Fourier transform of the average horizontal and/or vertical brightness distribution, and to take Fourier frequencies and associated Fourier parameters from this/these Fourier transform(s) and save them as data describing the Fourier transform.

In another advantageous embodiment, the processor can be a component of the camera. For example, it is a microcontroller integrated in the camera. It is, however, also possible for the processor to be located partially inside and partially outside of the camera, wherein a functional separation between different functions of the readout apparatus can occur.

Moreover, the corrective image, or respectively the data needed to describe the corrective image, is advantageously stored within the camera in an especially non-volatile data memory located therein. To this end, the camera for example comprises a flash memory module, an EPROM, an FeRAM, MRAM and/or PCRAM memory module.

Moreover, the data describing the corrective image can be stored in an internal memory of the microcontroller. It can also be advantageous that the image correction occurs within the camera so that it provides image data that is already corrected in other image processing units, or respectively a corrected flow of image data.

The same or similar advantages which are already explained with respect to the method for correcting errors in such a digital imaging system can also apply to the digital imaging system as such. Moreover, the features of the invention cited with reference to the method are equally or similarly applicable to the digital imaging system.

Further features of the invention will become apparent from the description of embodiments according to the invention together with the claims and the included drawings. Embodiments according to the invention can fulfill individual characteristics or a combination of several characteristics.

The invention is described below, without restricting the general idea of the invention, based on exemplary embodiments in reference to the drawings, wherein we expressly refer to the drawings with regard to the disclosure of all details according to the invention that are not explained in greater detail in the text.

BRIEF DESCRIPTION OF THE DRAWINGS

In the drawings, the same or similar types of elements and/or parts are provided with the same reference numbers so that a re-introduction is omitted.

DETAILED DESCRIPTION

Figure 1:
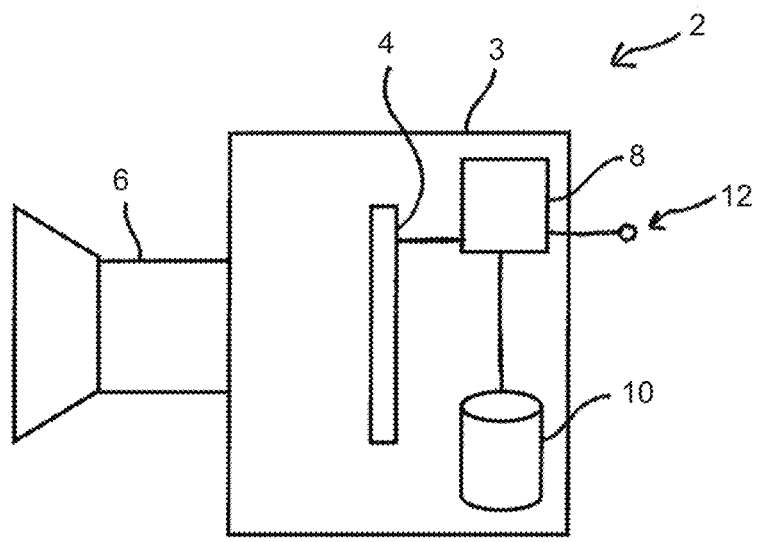
FIG. 1 shows a schematic digital imaging system.

FIG. 1 schematically portrays a digital imaging system 2 comprising a camera 3 with an image sensor 4. The image sensor 4 comprises a flat image sensor 4 such as a CCD or CMOS sensor. Likewise, the camera 3 is designed like a line scan camera and comprises a linear image sensor 4. A camera 3 with a flat image sensor 4 is referenced below as an example only. An image field captured by a lens 6 of the camera 3 is imaged on the flat image sensor 4. Alternatively, it is also possible for the camera 3 to be mounted on another optical imaging apparatus such as a microscope that, if necessary, replaces the lens 6 in order to image an image field. The flat image sensor 4 is read out by the readout apparatus 8. The readout apparatus 8 is for example a microcontroller. In addition to the readout apparatus 8, the camera 3 comprises a data memory 10 such as a non-volatile data memory. The non-volatile data memory 10 can comprise a flash memory, a ferroelectric random-access memory (FERAM) or a magnetoresistive random-access memory (MRAM). The camera 3, or respectively the readout apparatus 8 can be coupled by a connection 12 to other data processing devices used for image processing or image capturing such as a computer to capture and analyze the digital image data captured by the camera 3. The connection 12 moreover serves to control and/or supply power to the camera 3 if necessary.

Figure 2:
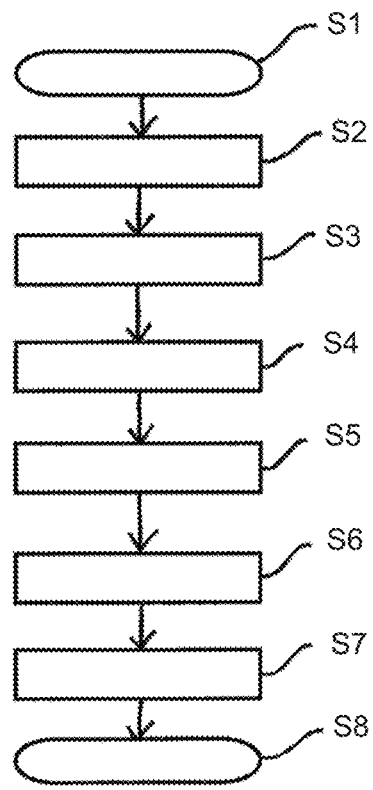
FIG. 2 shows a schematic flow chart of a method for correcting errors in such a digital imaging system.

FIG. 2 shows a simplified flowchart of a method for correcting errors in the digital imaging system 2 shown as an example in FIG. 1. In particular, the readout apparatus 8 is configured to perform the portrayed method. It is also possible for the method to be partially performed by the readout apparatus 8 and partially by an imaging processing unit such as a computer that is connected to the camera 3 by the connection 12. The method schematically depicted in FIG. 2 will be explained below with reference to the depictions in FIGS. 3 to 14(b).

After the start (step S1) of the method, a dark current image (step S2) is captured with the assistance of the flat image sensor 4 and the readout apparatus 8. The dark current image is captured by both units in order to capture and correct systematic errors of the overall system.

Figure 3:
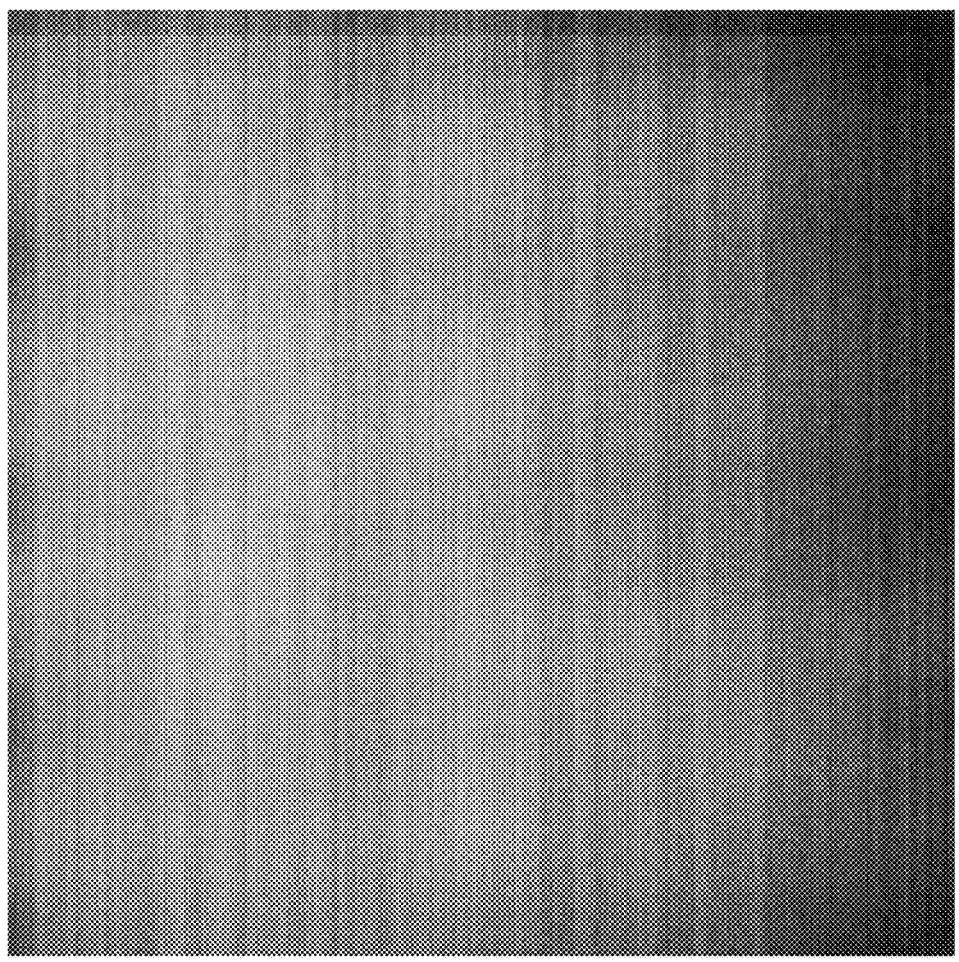
FIG. 3 shows an uncorrected dark current image of a digital imaging system.

FIG. 3 shows an example of a dark current image that is captured in step S2. This has the frequently occurring, production-related vertical stripe structure such as can be observed as an artifact in CCD and CMOS sensors. In addition to the artifacts from the production process of the flat image sensors 4, such patterns also occur from frequency overlays such as from digital clock signals. Another reason for the occurrence of stationary artifacts are reflections in the infrared range on the back of the silicon of the flat image sensor 4.

Figure 4:
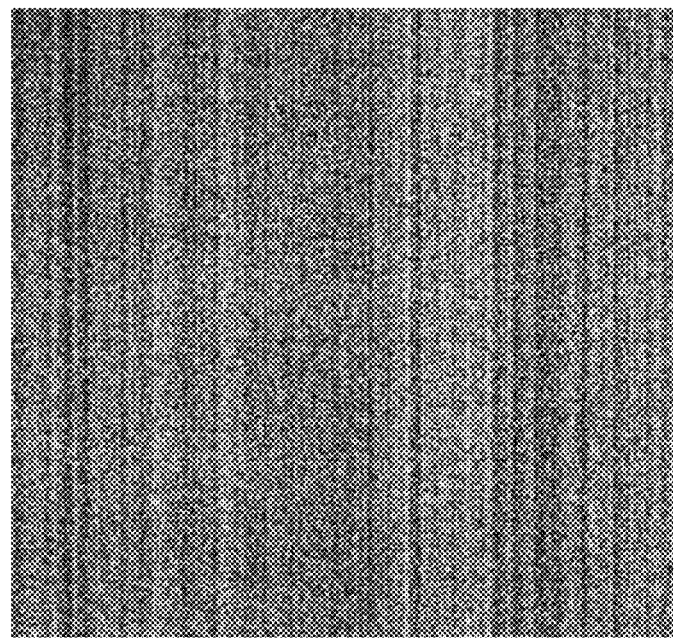
FIG. 4 shows an enlargement of a section of the dark current image shown in FIG. 3.

FIG. 4 shows an enlargement of a section of the dark current image shown in FIG. 3. The vertical stripe structure overlaps the background noise in the image sensor.

Based on the image data of the dark current image as, for example, shown in FIG. 3, a Fourier transform is generated (step S3 in FIG. 2). There are several options according to various exemplary embodiments for calculating the Fourier transform based on the image data from the dark current image.

It is for example possible to generate a 2D Fourier transform based on the image data of the dark current image (see FIG. 3).

Apart from this 2-D Fourier transform, the Fourier frequencies and Fourier coefficients are considered along a line running through this 2-D Fourier transform. It is in principle possible to place this line in any direction through the 2-D Fourier transform and consider the Fourier frequencies and Fourier coefficients along this line.

According to an exemplary embodiment, the central column, or respectively line is taken from the calculated 2-D Fourier transform in a vertical and horizontal direction and saved as a Fourier transform.

Figure 5:
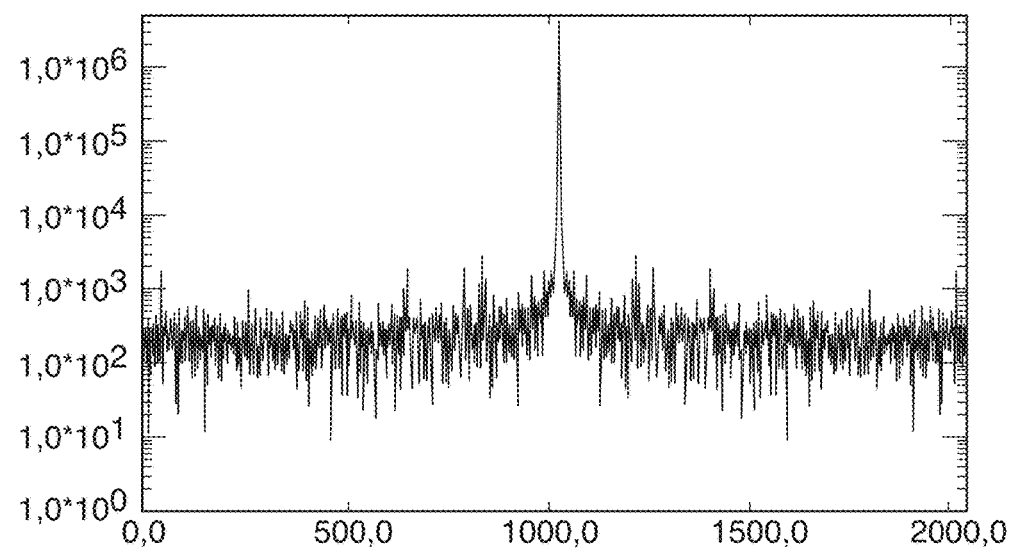
FIG. 5 shows a schematic Fourier spectrum of a corrective image for vertically correcting the image depicted in FIG. 3.

The Fourier frequencies and associated Fourier parameters that were taken from the central vertical axis and provided for the vertical correction of the image are shown as an example in FIG. 5. In the same manner, the Fourier frequencies and associated Fourier parameters that were taken from the horizontal central line and provided for the horizontal correction of the image are shown as an example in FIG. 6.

Figure 6:
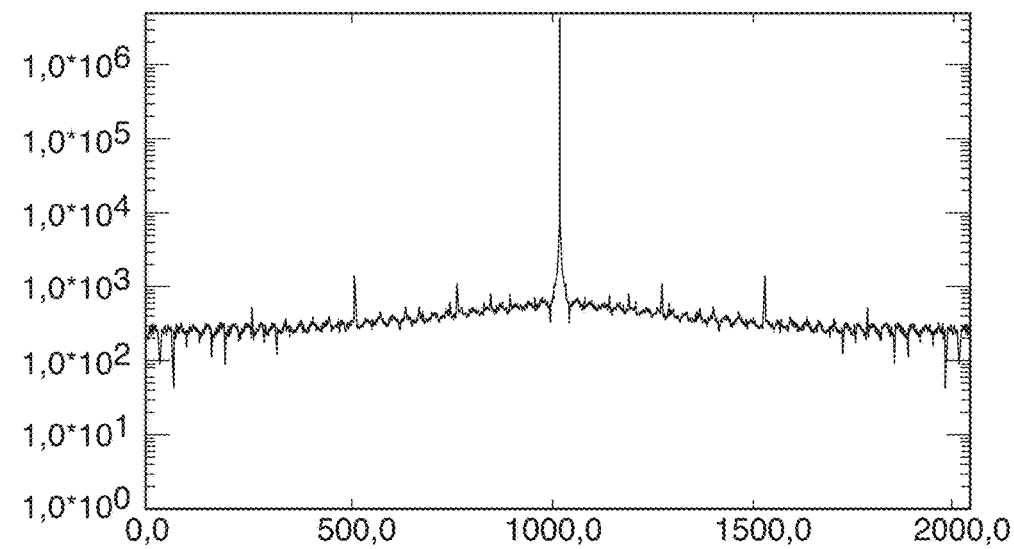
FIG. 6 shows a schematic Fourier spectrum of a corrective image for horizontally correcting the image depicted in FIG. 3.

In other words, the Fourier spectrum shown in FIG. 5 contains the information for describing the periodic errors of the dark current image occurring in a vertical direction. FIG. 6 contains the information that is necessary to describe the errors occurring in a horizontal direction in the dark current image. Due to the pronounced vertical stripe structure, the Fourier spectrum shown in FIG. 6 that serves to horizontally correct the image errors has pronounced periodic components.

Since, proceeding from the 2D Fourier spectrum, only those Fourier coefficients, or respectively parameters, are considered that depict the vertical, or respectively horizontal components of the dark current image, the amount of data of the Fourier transform used to describe the corrective image is significantly less in comparison to the corrective image itself. It is therefore possible to save the data describing the Fourier transform, such as the Fourier coefficients and associated Fourier frequencies shown in FIGS. 5 and 6, in a comparatively small internal data memory 10 of the camera 3 (step S4 in FIG. 2). These data are saved for example in an internal memory of a microcontroller that serves as a readout apparatus 8. It is also possible to store the corresponding data in a non-volatile data memory 10 that is coupled to the readout apparatus 8.

According to another exemplary embodiment, a complete 2-D Fourier transform is not generated proceeding from the captured dark current image (see FIG. 3). The intensity values of the dark current image are instead totaled horizontally or vertically. For example, the brightness values are added up pixel by pixel in the lines and/or columns of the taken dark current image for all lines, or respectively columns. The totals can then be standardized by dividing by the number of pixels in a line, or respectively column.

Then the calculated average brightness value is used in order to determine an average brightness distribution in a horizontal or vertical direction. This average brightness distribution forms the starting point for calculating the horizontal and vertical Fourier transform. The spectra that are obtained in this manner are comparable with the Fourier spectra (that were calculated in a different way) shown in FIGS. 5 and 6.

As a result, the amount of data is again substantially reduced by the performed averaging so that it is also possible to store the data describing the Fourier spectrum, in particular the Fourier frequencies and associated Fourier coefficients, in an internal data memory 10 of the camera 3. Advantageously, a data memory with a small size, or respectively with a small memory volume, is sufficient for saving the data describing the Fourier transform of the dark current image.

Additional images are then captured with the camera 3, i.e., with the assistance of the flat image sensor 4 and the readout apparatus 8 (step S5 in FIG. 2).

A corrective image is generated to correct these images. This is calculated based on the saved data describing the Fourier transform of the dark current image by back-transforming the Fourier transform (step S6 in FIG. 2).

Figure 7:
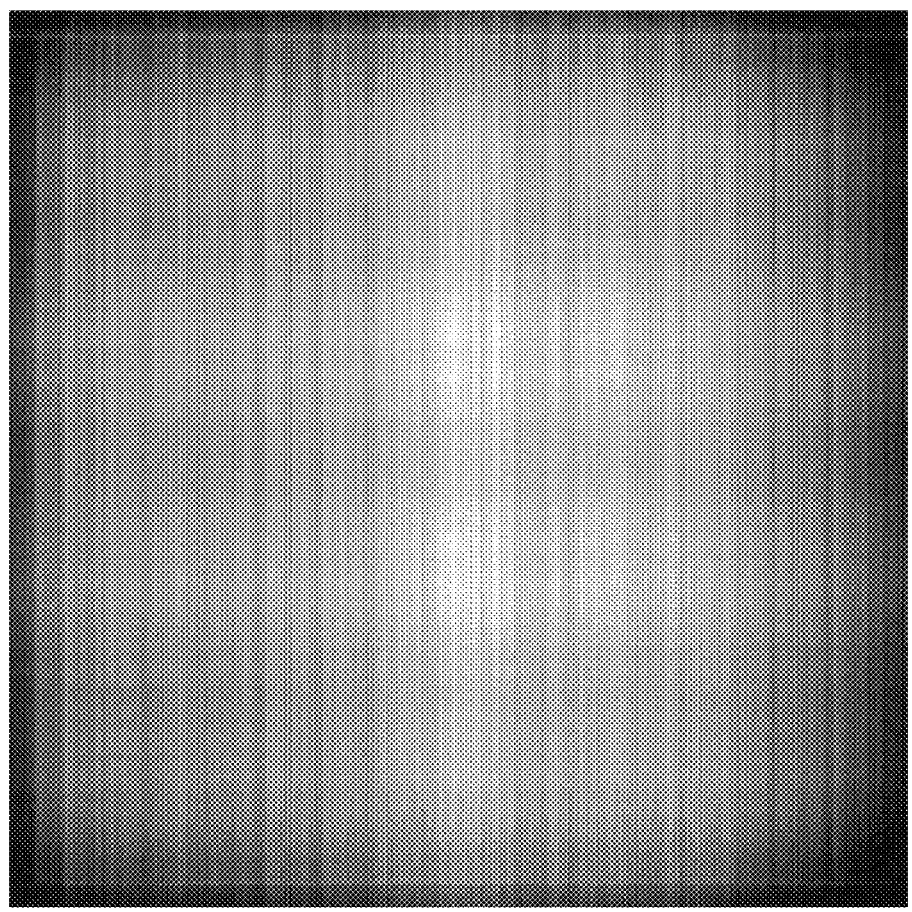
FIG. 7 shows a corrective image calculated from the Fourier spectra from FIGS. 5 and 6.

FIG. 7 shows as an example such a corrective image that was calculated based on the Fourier spectra shown in FIGS. 5 and 6.

To correct the artifacts in the digital imaging system 2, the corrective image (see FIG. 7) is removed from another captured image (step S7 in FIG. 2). In particular, this correction is carried out by removing the corrective image pixel by pixel from the captured image. Likewise, other suitable mathematical operations can, however, be provided between the captured image and the corrective image.

Figure 8:
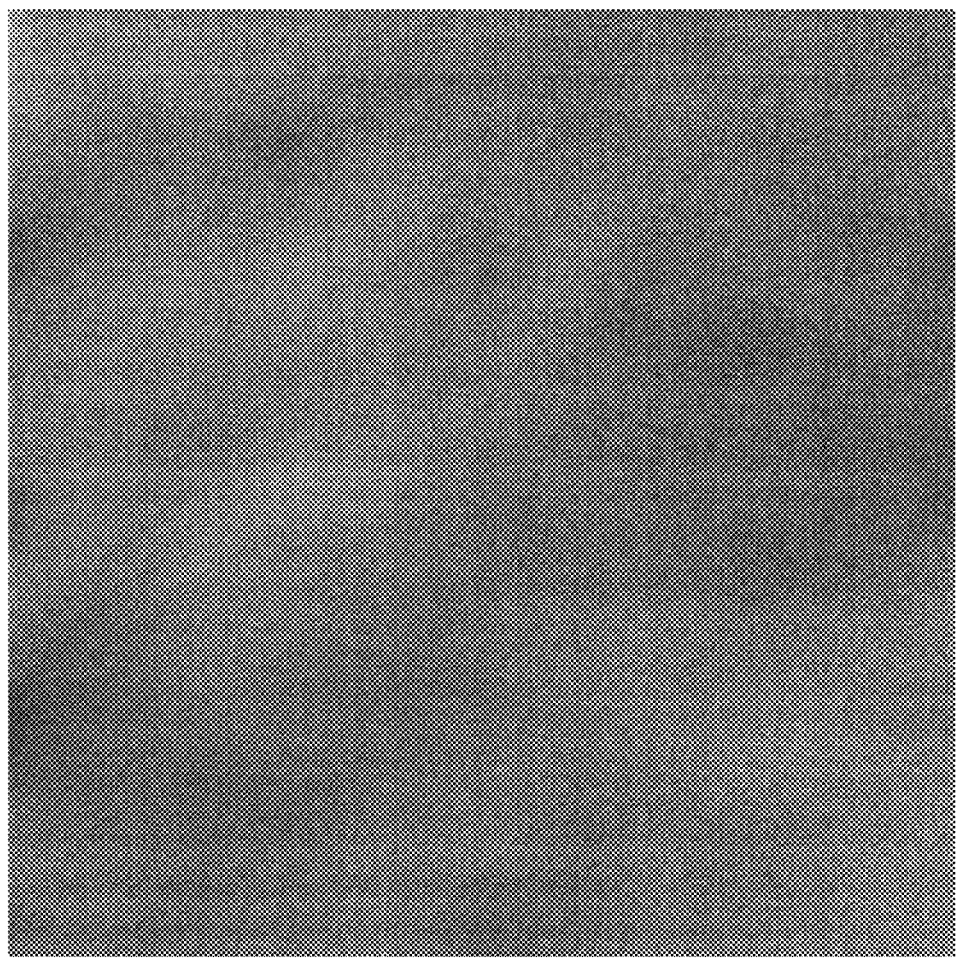
FIG. 8 shows a corrected dark current image that arises by applying the corrective image shown in FIG. 7 to the dark current image in FIG. 3.

To illustrate the success of this error correction, FIG. 8 shows the difference between the dark current image shown in FIG. 3 and the corrective image depicted in FIG. 7. Only the statistical and homogeneous background noise of the flat image sensor 4 remains as the differential image between these two images. Periodic vertical and horizontal artifacts are largely eliminated; the image has a homogeneous brightness distribution.

Figure 9:
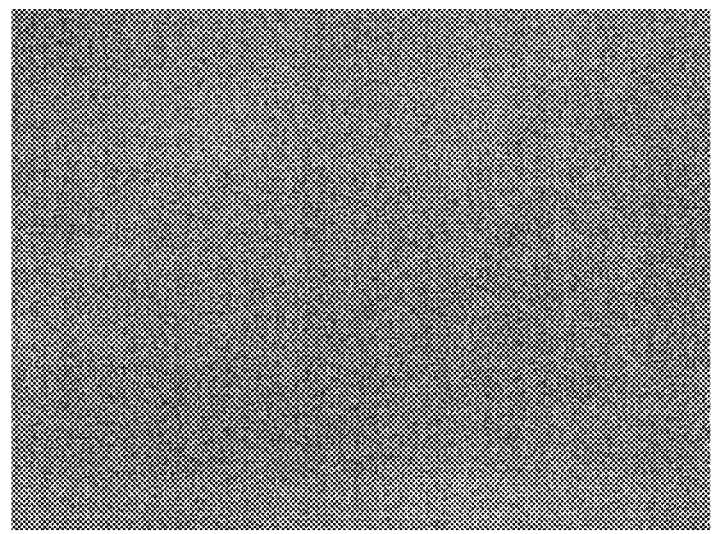
FIG. 9 shows an enlargement of a section of the corrected dark current image shown in FIG. 8.

This is also revealed by the detail enlargement depicted in FIG. 9 of the image known from FIG. 8.

In order to further reduce the data needed to describe the corrective image, only those Fourier frequencies are included in the Fourier transform(s) of the captured dark current image that significantly contribute to the image information. According to another exemplary embodiment, data are therefore selected from the data describing the Fourier transform of the dark current image that have a value that in particular lies above a predetermined threshold. In other words, those Fourier frequencies are selected with Fourier parameters having a value above the threshold. Alternatively, the Fourier frequencies can be selected that most clearly contribute to the image information. For example, the Fourier frequencies with the greatest n Fourier parameters are selected, wherein the number n can be selected corresponding to the available memory. The result is a reduced set of Fourier coefficients that describes the interfering signals in close approximation.

Figure 10:
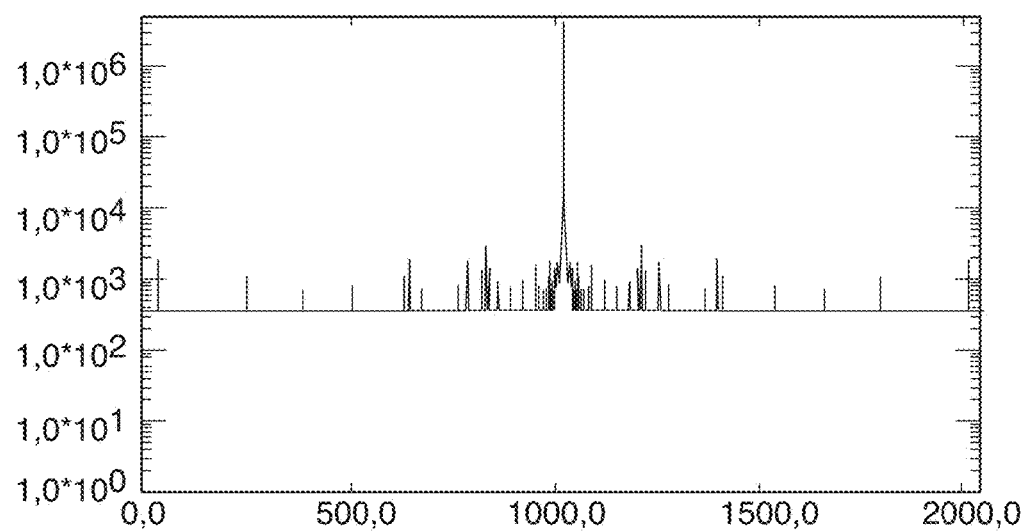
FIG. 10 shows a reduced schematic Fourier spectrum for the horizontal error correction that is determined based on the Fourier spectrum depicted in FIG. 5.
Figure 11:
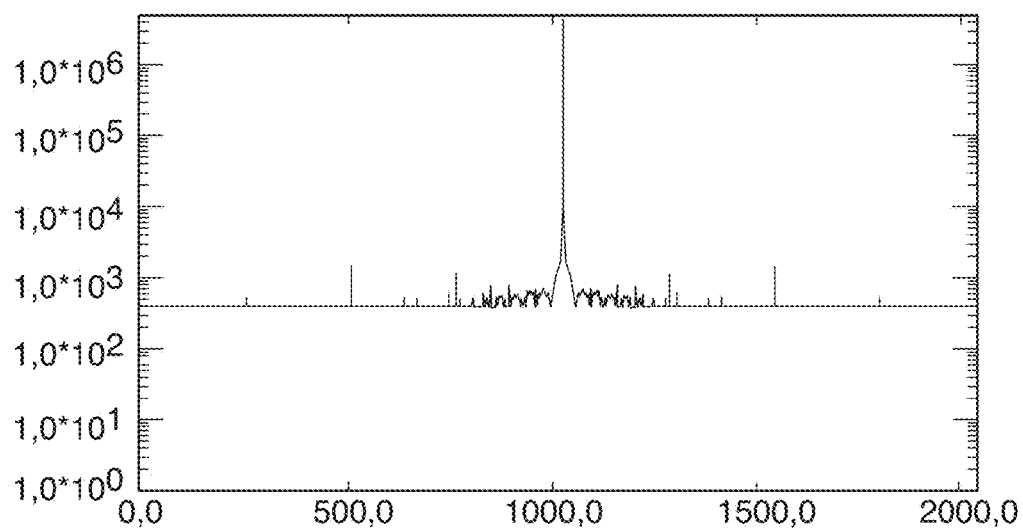
FIG. 11 shows a reduced schematic Fourier spectrum for the vertical error correction that is determined based on the Fourier spectrum depicted in FIG. 6.

For example, reduced Fourier spectra are shown in FIGS. 10 and 11. FIG. 10 shows the Fourier spectrum already known from FIG. 5 by which a first threshold T1 has been established, and only the Fourier frequencies and associated Fourier parameters are considered that have a value that lies above this first threshold T1. The remaining Fourier frequencies are rejected since they do not significantly contribute to the image information of the dark current image. FIG. 11 shows the Fourier spectrum already known from FIG. 6 by which a second threshold T2 has been established analogous to FIG. 10, and Fourier parameters with an amplitude that lies below this second threshold T2 are not considered.

Figure 12:
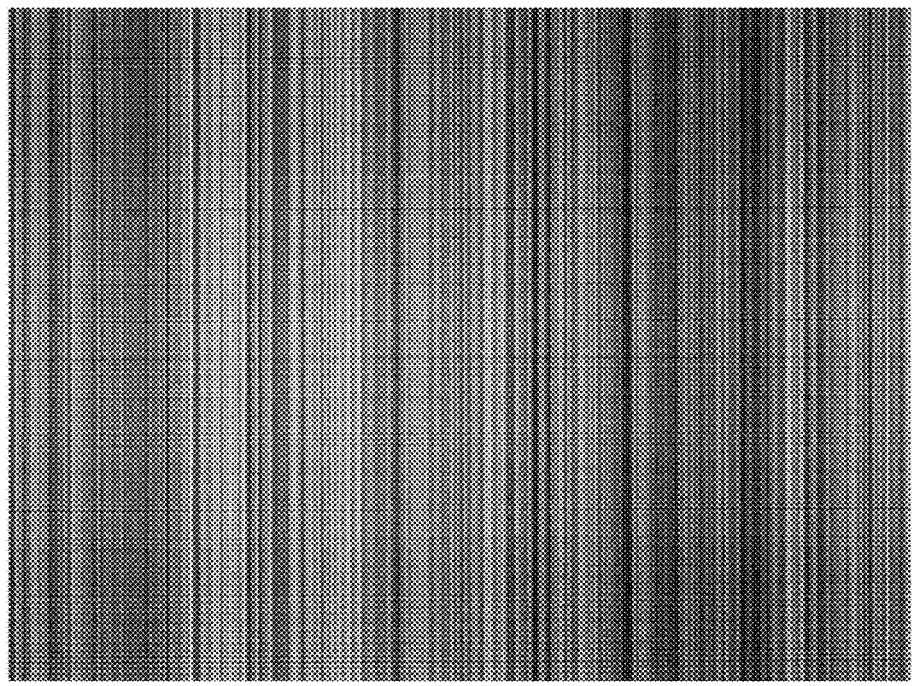
FIG. 12 shows a corrective image calculated from the reduced Fourier spectra shown in FIGS. 10 and 11.

Proceeding from the reduced data set generated in this manner, a corrective image is calculated that for example is shown in FIG. 12.

Figure 13:
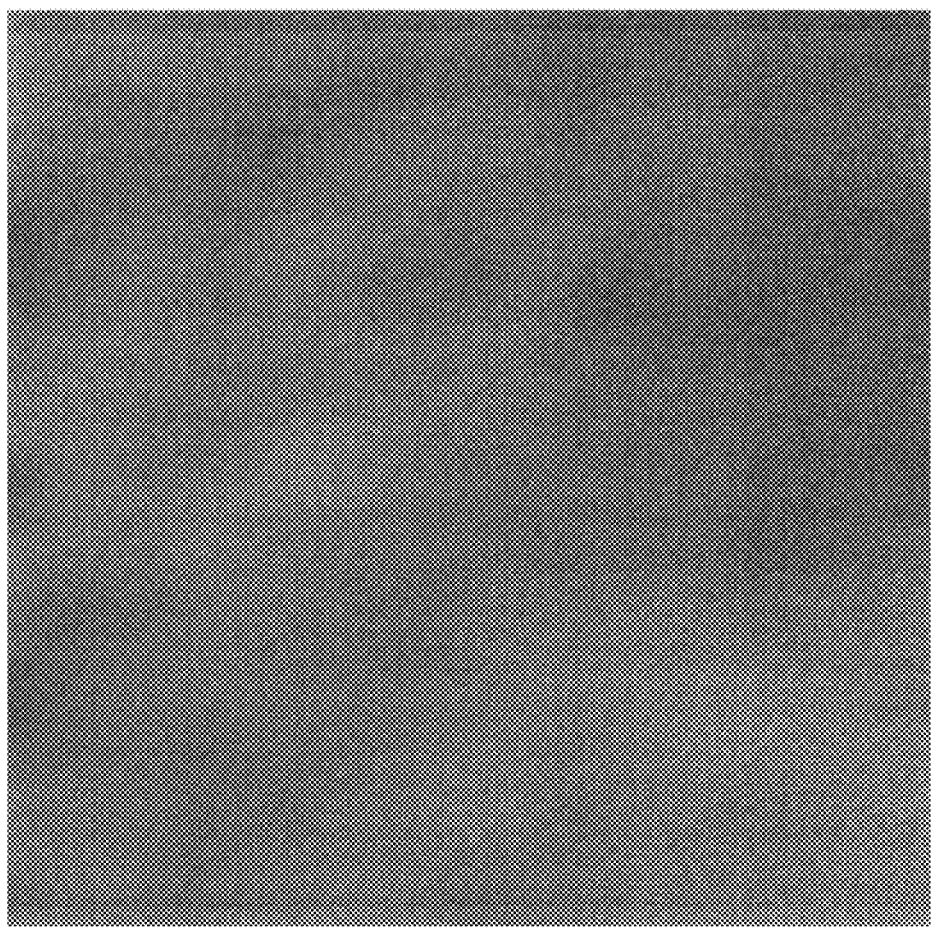
FIG. 13 shows a corrected dark current image that arises by applying the corrective image shown in FIG. 12 to the dark current image shown in FIG. 3.

This corrective image is also suitable to effectively correct the systematic horizontal and vertical artifacts of the digital imaging system 2. To illustrate the effectiveness of this method for correcting errors that is based on a reduced data set, the corrective image shown in FIG. 12 has been removed from the dark current image shown in FIG. 3. FIG. 13 shows the differential image. Horizontal and vertical image artifacts arising in particular from the production process of the flat image sensor 4 are effectively eliminated.

FIG. 14 shows a comparison of an image correction based on the Fourier spectra shown in FIGS. 5 and 6 with a correction based on the reduced Fourier spectra shown in FIGS. 10 and 11.

Figure 14A:
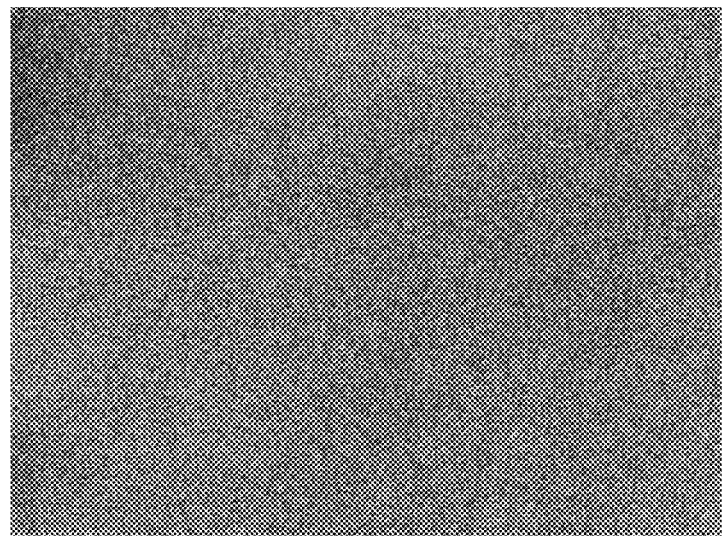
FIG. 14(a) shows an enlargement of a section of the corrected dark current image shown in FIG. 13.
Figure 14B:
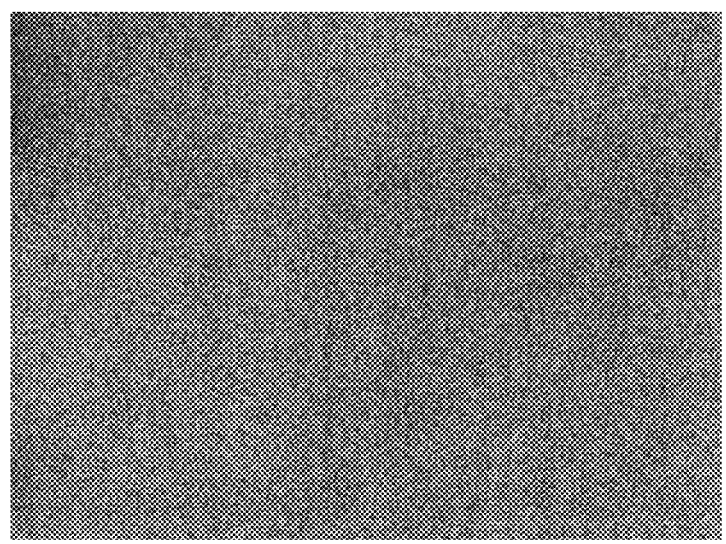
FIG. 14(b) shows an enlargement of a section of the corrected dark current image shown in FIG. 8 that is identical with the depiction in FIG. 9.

FIG. 14(a) shows a section of an image from FIG. 13. This image was calculated based on the corrective image shown in FIG. 12. The corrective image in FIG. 12 is based on a reduced data set. The corrective image in FIG. 12 is based on the Fourier spectra shown in FIGS. 10 and 11. FIG. 14(b) shows a section of an image from FIG. 8 which is identical with that from FIG. 9. FIG. 8 was calculated based on the dark current image as shown in FIG. 3 taking into account the corrective image in FIG. 7. The corrective image in FIG. 7 is based on the Fourier spectra shown in FIGS. 5 and 6.

As revealed by the comparison of the images sections shown in FIGS. 14(a) and 14(b), the correction of the existing image artifacts based on the Fourier spectra from FIGS. 5 and 6 and the reduced Fourier spectra in FIGS. 10 and 11 are practically identical. As a result, the corrected images are indistinguishable. In both cases, only the statistical and homogeneous background noise of the flat image sensor 4 can be observed.

The aforementioned statements apply analogously to a digital imaging system 2 with an image sensor 4 that is linear and therefore not flat. In such an exemplary embodiment, the employed mathematics shrink to a single dimension.

The method for correcting errors depicted in the flowchart in FIG. 2 finally concludes in step S8.

Embodiments according to the invention can be fulfilled through individual features or a combination of several features. In the context of the invention, features which are designated with "in particular" or "preferably" are to be understood as optional features.

REFERENCE NUMBER LIST

2 Digital imaging system
3 Camera
4 Image sensor
6 Lens
8 Readout apparatus
10 Data memory
12 Connection
T1 First threshold
T2 Second threshold

What is claimed is:

1. A method for correcting image errors in a digital imaging system, the method comprising:
capturing, by an image sensor, a dark current image;
reading out, by a readout apparatus, the image sensor;
generating, by a processor comprising hardware, a Fourier transform by means of a Fourier transformation on the basis of image data of the dark current image;
controlling, by the processor, to save data which describe the Fourier transform;
back-transforming, by the processor, the Fourier transform by subjecting the saved data to Fourier transformation and generating, by the processor, a corrective image from the back-transformed data; and
correcting, by the processor, the image errors in the digital imaging system in another image captured using the image sensor by offsetting image data from the another captured image with image data from the corrective image;
wherein the image sensor comprises a flat image sensor, wherein the flat image sensor comprises a plurality of pixels arranged in a regular grid of lines and columns,
wherein the image data of the dark current image are pixel values depicted in the regular grid; and
wherein generating the Fourier transform further comprises:
generating a discrete 2-D Fourier transform that is based on the pixel values of the dark current image and is also depicted in the regular grid of the flat image sensor;
wherein Fourier frequencies and associated Fourier parameters are taken from the discrete 2-D Fourier transform along a line or along a column that runs at least approximately through a center of the discrete 2-D Fourier transform, and the Fourier frequencies and associated Fourier parameters are saved as the data describing the Fourier transform.

2. The method according to claim 1, wherein the digital imaging system comprises a camera,
wherein the camera comprises:
the image sensor; and
a non-volatile data memory; and
wherein method further comprises:
saving the data describing the Fourier transform in the non-volatile data memory.

3. The method according to claim 1,
wherein the readout apparatus comprises a camera.

4. The method according to claim 1, comprising:
selecting data or data sets from one or more of:
the data describing the Fourier transform whose values lie above a predetermined threshold;
a predetermined number of data or data sets are selected from the data describing the Fourier transform whose values are the highest in comparison to the values of the remaining data or data sets; and
forming a reduced data set describing the Fourier transform from the selected data or data sets.

5. A digital imaging system comprising:
an image sensor configured to capture a dark current image;
a readout apparatus configured to read out the image sensor; and
a processor comprising hardware, wherein the processor is configured to:
generate a Fourier transform by means of a Fourier transformation on the basis of image data of the dark current image;
save data describing the Fourier transform;
back-transform the Fourier transform by subjecting the saved data to Fourier transformation and generate a corrective image from the back-transformed data; and
correct image errors in the digital imaging system in another image captured using the image sensor by offsetting image data from the another captured image with image data from the corrective image;

wherein the image sensor comprises a flat image sensor, wherein the flat image sensor comprises a plurality of pixels arranged in a regular grid of lines and columns;

wherein the image data of the dark current image are pixel values depicted in the regular grid; and wherein the processor is configured to:

generate the Fourier transform by generating a discrete 2-D Fourier transform that is based on the pixel values of the dark current image and is also depicted in the regular grid of the flat image sensor;

wherein Fourier frequencies and associated Fourier parameters are taken from the discrete 2-D Fourier transform along a line or along a column that runs at least approximately through a center of the discrete 2-D Fourier transform, and the Fourier frequencies and associated Fourier parameters are saved as the data describing the Fourier transform.

6. The digital imaging system according to claim 5, comprising:

a camera comprising the image sensor; and a non-volatile data memory configured to save the data describing the Fourier transform of the dark current image.

7. The digital imaging system according to claim 5, comprising:

a camera comprising the image sensor.

8. The digital imaging system according to claim 5, wherein the processor is configured to:

select data or data sets from one or more of:

the data describing the Fourier transform whose values lie above an in particular predetermined threshold; and a predetermined number of data or data sets from the data describing the Fourier transform whose values are the highest in comparison to the values of the remaining data or data sets; and form a reduced data set describing the Fourier transform from the selected data or data sets.

* * * * *